United States Patent Office 3,647,682
Patented Mar. 7, 1972

---

3,647,682
OLEFIN PRODUCTION BY THE CATALYTIC TREATMENT OF HYDROCARBONS
Jule Anton Rabo, Armonk, Charles Leslie Angell, Pleasantville, and Gary William Skeels, Jr., Brewster, N.Y., assignors to Union Carbide Corporation, New York, N.Y.
No Drawing. Filed Oct. 23, 1968, Ser. No. 770,084
Int. Cl. C10g *11/04;* C01b *33/28;* C07c *11/02*
U.S. Cl. 208—120                                    5 Claims

ABSTRACT OF THE DISCLOSURE

Olefins are obtained in high yield by the catalytic cracking of petroleum feedstocks, particularly those rich in saturated hydrocarbons, using novel zeolitic molecular sieve catalysts which are fully cationized with monovalent and/or bivalent metal cations and which have less than three surface structural hydroxyls per hundred framework aluminum atoms.

---

The present invention relates in general to the production of olefins from saturated hydrocarbons and more particularly to the production of olefins by the catalytic cracking of petroleum fractions in which novel and highly selective zeolitic molecular sieve catalysts are employed.

The catalytic conversion of hydrocarbons, especially petroleum feedstocks, to produce high yields of one or more specific conversion products or to obtain a desired balance of conversion products has been the subject of much investigation. Much of the previously reported experimental work has been carried out with silica-aluminum gel type catalysts but more recently the emphasis has shifted to studies using zeolitic molecular sieve compositions. These investigations, other than those which are mere trial and error approaches, have as their ultimate objective an understanding of the relationship of structural features of the catalyst, such as hydroxyl groups, with catalytic properties.

Despite some conclusions drawn by various investigators, no unequivocal experimental proof has been shown to fully confirm any proposed theory linking structural models of zeolites with their observed catalytic properties. Part of the reason for this is the complexity of molecular sieve catalyst compositions and another part is the difficulty of interpreting the reaction mechanism from a knowledge of the composition of converted product. Consequently, it has not been possible in most instance to alter the structural properties of a molecular sieve to obtain predictable results in hydrocarbon conversion processes. Especially is this true where high selectivity and high activity of the catalyst are both important factors.

An increasingly serious situation has developed since the wide adoption of zeolitic molecular sieve catalysts in "carbonium ion" type hydrocarbon reactions such as cracking. Formerly, when this reaction was carried out in the presence of silica-alumina gel type materials, the yield of olefins in the reaction product was sufficient to satisfy a substantial portion of the need of the chemical industry. Ironically, this need of the chemicals industry was satisfied partly because the olefin production could not be avoided even though its presence in gasoline blends was not favored. The new zeolite catalysts, however, employed in the conversion of the same petroleum feedstocks, appear to produce less olefin product, not so much by design but by accident of the inherent structural properties of the zeolite as will become more apparent from the description of the present invention appearing hereinafter. An anticipated growth in hydrocracking processes will have further profound effects on the availability of olefins since hydrocracking produces increased amounts of propane, butane and isobutane, but substantially no olefins. The decrease in production of olefins in petroleum refining combined with a growing industrial need for olefins has created the need for a new and efficient olefin production process.

Accordingly, it is the general object of the present invention to provide a new and improved process for producing olefins from petroleum feedstocks, preferably those containing mainly saturated hydrocarbons.

It is another object to provide a process for catalytically cracking paraffinic hydrocarbons to produce ethylene and propylene.

It is a further object to provide a catalytic hydrocarbon cracking process in which the production of branched chain paraffins and branched chain olefins is minimized.

It is another object to provide novel zeolitic molecular sieve compositions for use as hydrocarbon cracking catalysts which have high selectivity and activity for their intended function and which engender only minimal coke formation.

The foregoing objects are readily accomplished in accordance with the present invention by employing in contact with saturated hydrocarbons at elevated temperatures, and preferably elevated pressures, a three-dimensional crystalline zeolitic molecular sieve catalyst having a pore size large enough to adsorb benzene and having in the dehydrated state the general formula expressed in terms of mole ratios of oxides as

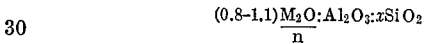

$$(0.8\text{-}1.1)\mathrm{M_{2/n}O : Al_2O_3} : x\mathrm{SiO_2}$$

wherein $x$ has a value of from 2 to about 20, preferably $>3$ to 15; M is a monovalent or a bivalent metal cation or mixture of said monovalent and bivalent metal cations, preferably at least 20 equivalent percent being alkali metal cations; $n$ is the valence of metal M; said zeolite containing less than 3, and preferably less than 1, surface hydroxyl per 100 framework aluminum atoms, which surface hydroxyl exhibits infrared absorption in the region of 3500 to 3700 cm.$^{-1}$. As used herein and in the appended claims the term "surface hydroxyl" shall mean those zeolitic hydroxyl groups which give rise to an infrared absorption band which is shifted to a frequency at least 20 cm.$^{-1}$ lower by adsorbed pyridine. It is not necessary that the new shifted band be detectable as such, since in some instances the shift causes the band to be so diffuse as to be virtually undetectable. Such surface hydroxyls include those on the exterior crystal surfaces as well as those in the internal cavities of the crystal.

Suitable monovalent and bivalent metal cations which can be present in the zeolite catalyst of this invention are Na$^+$, K$^+$, Rb$^+$, Cs$^+$, Fr$^{+1}$, Tl$^+$, Mg$^{++}$, Mn$^{++}$, Zn$^{++}$, Ca$^{++}$, Sr$^{++}$ and Ba$^{++}$. The monovalent and bivalent metal cations having ionic radii larger than 1.10 A. are especially preferred since zeolitic molecular sieves containing only these cations can more easily be prepared in the hydroxyl poor form required and once prepared are more resistant toward re-hydroxylation. Especially preferred cations are K$^+$, Tl$^+$, Cs$^+$, Rb$^+$, Sr$^{++}$, and Ba$^{++}$. The ionic radii values employed for purposes of this invention are those appearing in Handbook of Chemistry and Physics, 48th Ed., pages F-143-4, and published by the Chemical Rubber Publishing Co., U.S.A.

In accordance with the foregoing description of the catalyst, it is to be understood that the zeolite be fully cationized, i.e., contains substantially no decationized sites such as result from the thermal treatment of the corresponding ammonium or acid exchanged forms as described in U.S. Pat. No. 3,130,006, and that the cations which are present as a part of the zeolite structure be selected solely from monovalent and bivalent metallic cations and preferably those that are the most resistant to being reduced to elemental metal form by the hydrocarbons, the cracking of which is being catalyzed by the zeolite composition. Metal cations which have a tendency to be reduced to the metal form are $Ag^+$, $Cd^{++}$ and $Ni^{++}$ and though these cations are entirely suitable in the zeolite of this invention so long as they remain cations, their reduction to metallic form permits the development of undesirable sites in the zeolite structure. This is not to say, however, that the zeolite catalyst compositions of this invention cannot contain elemental metal loaded in or impregnated on the zeolite or matrix material. Rather it is impermissible only that these element metal forms be derived by reduction of metal cations in such a manner and to the degree that there is introduced into the zeolite structure more than three hydroxyls per 100 framework aluminum atoms, which hydroxyls can not be thermally removed or chemically altered.

The catalyst can suitably be prepared from several synthetic crystalline zeolites well known in the art. Zeolite Y is especially preferred, but zeolite X, zeolite L, zeolite TMA–Ω (TMA–omega) and synthetic mordenite are also suitable as is the naturally occurring mineral faujastie. A complete description of the composition and method of preparation of zeolite X, zeolite Y, zeolite L and synthetic mordenite are to be found respectively in U. S. Pats. 2,882,244, 3,130,007, 3,216,789 and 3,375,064. Similar information regarding zeolite TMA–Ω is disclosed in copending application Ser. No. 655,318, filed July 24, 1967. In those cases where the zeolitic molecular sieve starting material contains cations other than those recited hereinbefore as permissible or does not contain permissible cations desired to be present, conventional ion exchange techniques can be utilized to alter the cation makeup of the zeolite.

In general, synthetic zeolitic molecular sieves are prepared from reaction gels which are very basic, i.e., have a high pH. In isolating the newly formed molecular sieve crystals from the mother liquor, it is conventional to thoroughly wash the crystals with water or in some instances with a very dilute acid solution having a pH about 4.5. While this washing procedure is employed primarily for the purpose of removing occluded mother liquor, the water also acts as an ion exchange agent resulting in the replacement of some of the metallic cations of the zeolite by hydrogen cations, which then immediately forms hydroxyl groups. For purposes of the present invention, these hydroxyl groups are per se deleterious and, in addition, if they are removed by thermal treatment, the resulting product is too readily re-hydroxylated.

Certain zeolites, on the other hand, such as zeolite TMA–Ω and/or zeolite ZSM–4 (British Pat. 1,117,568, published June 19, 1968) are prepared from reaction gels in which the requisite basicity and the zeolite cation source is wholly or partially an organic hydroxy amine such as tetramethylammonium hydroxide or N,N'-dimethyltriethylene diammonium dihydroxide. The molecular sieve product, therefore, contains the corresponding substituted ammonium cations which at relatively moderate activation temperatures decompose to form hydroxyl groups. Upon further heating, the hydroxyl groups can also be removed, but they are readily regenerated in the presence of moisture.

Accordingly, when utilizing a molecular sieve starting material which contains hydroxy groups or other nonmetallic cations which are thermally decomposable, it is advantageous to treat such zeolites with metallic cations, preferably monovalent or bivalent, before the zeolite is heated to any appreciable degree.

Regardless of the type of molecular sieve involved or the cation "make-up" thereof, impermissible hydroxyl groups can also be present in the crystalline structure if the zeolite is contacted with water at high temperatures. Since for catalytic purposes a molecular sieve must be activated, i.e., dehydrated, to remove the water of hydration normally present immediately following synthesis, it is essential to activate the zeolite crystals under conditions which do not permit undue contact of the zeolite with the water vapor being evolved. It has been found that these steam-induced hydroxyl groups can be avoided by initially heating the hydrated zeolite crystals to moderate temperatures of from about 20 to 200° C. while using a dry air purge to remove the bulk of the water of hydration before raising the temperature to about 300 to 500° C. to fully activate the zeolite. Advantageously, a dry air purge or a partial vacuum is employed during the final heating period.

To obtain the final dehydroxylated zeolite catalyst of this invention, the dehydrated molecular sieve which contains the desired combination of monovalent and/or bivalent metal cations can be heated at a temperature of from 550° C. to about 800° C., usually for a period of from ½ to 2 hours. If the molecular sieve contains solely monovalent metal cations and has not been subjected to treatment such as undue washing, steaming and the like, which would introduce hydroxyl groups into the crystal structure heating to normal dehydration (activation) temperatures of about 600° C. is sufficient to obtain the final catalyst. If, however, the molecular sieve contains bivalent metal cations either alone or in combination with monovalent metal cations, it is necessary to heat the zeolite at higher temperatures and for longer periods than that required for simple activation. Precise heating times and temperatures to accomplish dehydroxylation will vary to some degree depending upon the cation composition, but optimum conditions for a given zeolite catalyst are routinely determined. In general, the higher the valence state and the smaller the size of the catalyst, the higher the activation temperature required to remove hydroxyl.

The removal of hydroxyls can thus be carried out by treatment of the zeolite at high temperatures, or by chemical treatment with such reagents as strong amines, boron and silicon compounds, or any other material that selectively reacts with surface hydroxyls. The result of the chemical treatment is the elimination of the hydroxyl groups from surface positions.

It is not necessary to employ in conjunction with the catalysts of this invention any additional or conventional catalysts or promoters, but it is not intended that such compositions be necessarily excluded. Practically any catalytically active metal or compound thereof can be present either on the external surface or in the internal cavities of the zeolite or otherwise carried on diluents or binders used to form agglomerates of the zeolite catalyst. In some instances elemental metals produce an advantageous result. For example, noble metals of the platinum group used in conjunction with the zeolite catalyst can effect the dehydrogenation of the hydrocarbon and result in improved olefin yields.

Suitable diluent materials include sintered glass, asbestos, silicon carbide, fire brick, diatomaceous earths, inert oxide gels such as silica gel, calcium oxide, magnesium oxide, rare earth oxides and α-alumina, γ-alumina and clays such as montmorillonite, attapulgite, bentonite and kaolin.

The hydrocarbon feedstocks which are selectively cracked to produce olefins in accordance with this invention can comprise substantially pure feedstocks of specific saturated hydrocarbon compounds such as n-butane, pentane, n-heptane, decane, duodecane and the like, or feedstocks containing paraffins and cycloparaffins preferably in an amount of at least 30% by volume, which feedstocks include any mineral oil fraction having an initial boiling point above about 100° F. and having an end boiling point of up to about 1000° F. This includes straight-run-gas oils, coker distillate gas oils, deasphalted crude oils, cycle oils derived from thermal cracking operations and the like. These fractions can be derived from petroleum crude oils, shale oils, tar sand oils and coal hydrogenation products. Specifically, it is preferred to employ feedstocks boiling between about 400° F. and 1000° F. and having an API gravity of 15–40°. The process of this invention is especially beneficial when applied to feedstocks containing mainly saturated hydrocarbons having a carbon chain of about 4 to about 30 carbon atoms. The benefit is derived specifically from the fact that the novel catalysts employed in this invention have excellent cracking activity while in general they produce very small amounts of isoparaffin products. Thus, the recycle feed remains nearly free of isoparaffins, and such recycle feedstreams are much more efficiently treated in thermal cracking processes to produce ethylene.

Further, the new catalyst system of this invention is that it does not dehydrogenate the recycle oil to the same degree as conventional acidic catalysts and, consequently its aromatic content is substantially less. Since the aromatic hydrocarbon molecules in the recycle oil cannot be cracked efficiently and thus result in a by-product of low value, the catalysts described in this patent application give an advantage over the existing catalytic cracking processes.

In the paraffin cracking process of this invention, the catalyst, either a single species as hereinbefore defined or any combination thereof, can be used in fixed bed operation, in moving bed operation, or in fluidized operation. The general operating conditions cover a wide range because of the wide range of activities of the catalyst. In cracking paraffins for the production of olefins, the temperatures at which the reactions may be conducted can vary in a wide range as low as 800° F. to about 1400° F. Preferably the reactions are conducted at from about 900° F. to 1100° F.

The cracking of normal hydrocarbons in accordance with the present invention can be conducted from subatmospheric to superatmospheric pressures. In some instances pressures of several hundred atmospheres may be used. Pressures of near atmospheric are preferably employed.

The amount of catalyst used will vary and depend on whether the process is used in a batch type of operation, a continuous, or a semicontinuous operation. Generally, in continuous and semicontinuous operations in which one or more reactor vessels are employed with the cyclic regeneration of the catalyst, the amount of catalyst used, as measured in terms of the weight hourly space velocities of the charge, may range from about 0.5 to 1000; preferably from about 2 to about 50.

It will be understood that the catalysts can be regenerated by buring off the coke deposits periodically using controlled amounts of oxygen or oxygen donors such as $CO_2$ in the known manner. Suitable regeneration techniques are described in detail in U.S. Pats. 3,069,362 and 3,069,363, issued Dec. 18, 1962.

Although we do not wish to be bound by any particular theory, it would appear that the catalytic reaction induced by the catalysts of this invention is of the radical type as distinguished from an ionic type reaction as induced by a silica-alumina gel catalyst. Accordingly, it is sometimes advantageous to utilize in addition to the dehydroxylated zeolites, conventional radical initiators such as trace amounts of oxygen, iodine, sulfur, diazomethane, alkyl iodide and the like.

In the examples that follow, the conversions were carried out in a fixed bed reactor provided with an inert gas purge means and a heating mantle by means of which a given catalyst sample could be dehydroxylated in situ prior to contact with the hydrocarbon feedstock. A gas chromatograph was attached to the exit end of the reactor through a sampling valve to facilitate product analysis.

EXAMPLE 1

Preparation of catalysts (A) Zeolite Y was freshly prepared from a reaction mixture of sodium hydroxide, sodium aluminate and fine particle precipitated silica and water in proportions such that the composition expressed in terms of oxide mole ratios was as follows:

$Na_2O/SiO_2$ --------- 0.41
$SiO_2/Al_2O_3$ --------- 27
$H_2O/Na_2O$ --------- 33

The reaction mixture was allowed to digest at ambient temperature for 24 hours and then was heated to 100° C. and maintained at that temperature for 48 hours. The resulting crystalline zeolite Y was filtered from the mother liquor and carefully washed with distilled water to a pH of 8.5. The $SiO_2/Al_2O_3$ ratio of the product zeolite Y was about 4.9.

(B) Portions of the sodium cation form of the product of part A were respectively ion-exchanged by contact with aqueous solutions of potassium, rubidium, cesium, calcium, magnesium, strontium, thallium ($Tl^{+1}$) and barium cations provided respectively by KCl, RbCl, $CsNO_3$, $CaCl_2$, $MgCl_2$, $Sr(NO_3)_2$, $TlNO_3$ and $BaCl_2$. The ion-exchange was continued at a temperature of about 100° C. until the original sodium cation content had been replaced to the extent that they constituted about 20 equivalent percent of the total cations of the zeolite. After cation-exchange, the zeolite crystals were in each case carefully washed with distilled water just until the wash water showed the absence of chloride ion or nitrate ion. The zeolite crystals were thereafter dried in an oven at about 110° C. using a dry air purge and pressed into tablets about ⅛ inch thick and about ¼ inch in diameter.

EXAMPLE 2

In four separate runs, catalyst samples prepared in accordance with Example 1, namely the sodium, potassium, thallium and cesium cation forms of zeolite Y, were loaded into a flow reactor and heated in vacuum for 16 hours at 600° C. The catalyst samples were employed in the form of ¼ inch diameter cylindrical pellets approximately ⅛ inch in length. Following activation the reactor was cooled to 575° C. A stream of dry n-butane vapor was passed through the catalyst having a space velocity of 210 liters/hour/kg. of catalyst. At the end of an hour period a 2 cc. sample of reactor effluent was passed directly into a gas chromatograph by means of a gas sampling valve attached to the exit end of the reactor. The results are shown in tabular form below (Table A).

TABLE A

| Catalyst | NaY | KY | $Tl^+Y$ | CsY |
| --- | --- | --- | --- | --- |
| Activation in vacuum, temp., ° C | 550 | 550 | 550 | 550 |
| Treatment following dehydroxylation | None | None | None | None |
| Hydroxyl content | (1) | (1) | (1) | (1) |
| Reaction temp., ° C | 575 | 575 | 575 | 575 |
| Contact time, sec | 11.9 | 11.9 | 11.9 | 11.9 |
| Conversion, percent | 12.52 | 20.08 | 23.31 | 23.14 |
| Products: [2] | | | | |
| Methane | 11.6 | 12.0 | 13.0 | 13.1 |
| Ethane | 11.2 | 12.4 | 11.8 | 12.5 |
| Ethylene | 15.1 | 15.6 | 20.4 | 17.2 |
| Propane | 1.3 | 0.8 | 1.0 | 0.8 |
| Propylene | 54.6 | 55.8 | 44.8 | 52.9 |
| Isobutane | | Not observed | | |
| Isobutene | 1.3 | 0 | 0.3 | 0.1 |
| n-Butenes | 4.8 | 3.4 | 8.7 | 3.4 |
| Olefin/paraffin | 3.14 | 2.96 | 2.88 | 2.78 |

[1] None observable, <1 per 100 Al atoms.
[2] The products are calculated in terms of carbon efficiency to show the mole percent of n-butane consumed to obtain the various products.

EXAMPLE 3

Catalyst samples, consisting of ¼ inch diameter pellets approximately ⅛ inch thick and prepared in accordance with Example 1, were loaded into a flow reactor and heated for 16 hours at near 600° C. in a stream of air, having a flow of 5 liters/hour and which was pre-dried over a column of 13× molecular sieve. Following activation the reactor was cooled to 550° C. The flow of air was turned off and a stream of dry n-butane vapor was passed through the catalyst having a space velocity of 210 liters/hour/kg. of catalyst, which corresponds to a contact time of ~12.2 seconds. At the end of an hour period a 2 cc.

sample of reactor effluent was passed directly into a gas chromatograph by means of a gas sampling valve attached to the exit end of the reactor. Following the reaction the catalyst samples were analyzed for coke by burning the carbon in a stream of oxygen and then measuring the quantity of CO and $CO_2$ formed. The results are set forth in Table B below.

alyst samples thus prepared were compared with hydroxyl poor samples of the same zeolite and with samples of thallium ($Tl^{+1}$) and barium cation exchanged zeolite Y catalyst prepared in accordance with the procedure of Example 1 supra, for their ability to produce propylene by the cracking of n-butane. The pertinent data are set forth in tabular form below, Table C.

TABLE C.—Cracking of n-Butane

| Catalyst | NaY | NaY | Tl+Y | CaY | CaY | BaY | Decationized Y |
|---|---|---|---|---|---|---|---|
| Activation in vacuum, temp., °C | 550 | 700 | 550 | 550 | 700 | 550 | 550 |
| Treatment following activation | None | Steam | None | None | Steam | None | None |
| Hydroxyl content, OH/100 Al | <1 | | <1 | ~3 | >3 | <2 | >10 |
| Reaction temp., °C | 550 | 550 | 550 | 550 | 550 | 550 | 550 |
| Contact time, sec | 12.2 | 12.2 | 12.2 | 12.2 | 12.2 | 12.2 | 12.2 |
| Conversion, percent | 4.51 | 7.15 | 10.88 | 19.68 | 46.85 | 19.21 | 48.32 |
| Products: [1] | | | | | | | |
| Methane | 11.2 | 17.2 | 12.1 | 20.3 | 9.1 | 13.6 | 18.0 |
| Ethane | 7.8 | 16.5 | 12.6 | 15.1 | 13.7 | 10.8 | 14.4 |
| Ethylene | 10.1 | 16.5 | 17.8 | 14.4 | 4.0 | 12.4 | 0 |
| Propane | 1.4 | 48.3 | 0.4 | 18.0 | 48.1 | 7.0 | 41.9 |
| Propylene | 55.6 | 0 | 50.8 | 26.7 | 1.9 | 50.2 | 0 |
| Isobutane | 5.0 | 1.5 | ([1]) | 5.5 | 23.3 | ([1]) | 22.7 |
| Isobutene | 1.8 | ([2]) | 0 | ([2]) | ([2]) | 2.0 | 0.6 |
| n-Butenes | 7.1 | ([2]) | 6.2 | ([2]) | ([2]) | 4.0 | 2.5 |
| Olefin/paraffin | 2.94 | 0.20 | 2.97 | 0.70 | 0.06 | 2.18 | 0.03 |

[1] The products are calculated in terms of carbon efficiency to show the mole percent of n-butane consumed to obtain the various products.
[2] None observable.
[3] Not analyzed.

TABLE B

| Catalyst | CaY | CaY | BaY | BaY | CsX | NaY |
|---|---|---|---|---|---|---|
| Activation in dry air, temp. °C | 550 | 700 | 550 | 590 | 550 | 550 |
| Treatment following dehydroxylation | None | None | None | None | None | None |
| Hydroxyl content, OH/100 Al | ~4 | <3 | <3 | <1 | ([1]) | ([1]) |
| Reaction temp. °C | 550 | 550 | 550 | 550 | 550 | 550 |
| Contact time, sec | 5.0 | 5.0 | 12.2 | 12.2 | 14.2 | 5.0 |
| Conversion, percent | 31.1 | 16.9 | 9.9 | 4.7 | 9.3 | 3.0 |
| Products: [2] | | | | | | |
| $H_2$ (moles/100 moles conv.) | 20.3 | | | | | 0.0 |
| Methane | 13.1 | 12.5 | 17.7 | 17.5 | 19.6 | 18.6 |
| $C_2$ | 18.5 | 22.3 | 30.2 | 28.9 | 31.1 | 32.3 |
| Propylene | 5.2 | 16.1 | 36.5 | 41.8 | 46.6 | 46.0 |
| Propane | 26.3 | 19.8 | 7.1 | 1.6 | | |
| n-Butenes | 5.2 | 3.3 | 6.4 | 10.3 | 2.7 | 3.2 |
| Isobutane | 15.0 | 7.7 | 0.0 | 0.0 | | 0.0 |
| Isobutene | 1.0 | 4.4 | 2.1 | 0.0 | | 0.0 |
| Carbon formation on the catalysts, wt. percent | 15.3 | 8.8 | 0.0 | 0.0 | 0.0 | 0.0 |

[1] None observable.
[2] The products are calculated in terms of carbon efficiency to show the mole percent of n-butane consumed to obtain the various products.

EXAMPLE 4

For purposes of demonstrating the specific effect of zeolite hydroxyl groups on the quantity of olefins recoverable from the cracking of a paraffin, samples of the NaY and CaY zeolites prepared in Example 1 were activated at 700° C. for a sufficient time to insure the absence of hydroxyl groups, and thereafter contacted with steam to form surface hydroxyl groups on the zeolites. In addition a sample of the NaY zeolite was ion exchanged with an ammonium chloride solution to replace about 90 equivalent percent of the sodium cations with ammonium cations and thereafter decationized. The cat-

EXAMPLE 5

Cesium and potassium exchanged catalyst samples, consisting of ¼ inch diameter pellets approximately ⅛ inch thick, were loaded into a flow reactor and heated for 16 hours at near 600° C. in a stream of air having a flow of 5 liters/hour and which was pre-dried over a column of 13× molecular sieve. Following activation the reactor was cooled to 550° C. and liquid feed consisting of a normal paraffin mixture or a "UCAR" mixture, was introduced to the catalyst by means of a syringe pump. The reaction product was collected and analyzed by mass spectroscopy. Following the reaction the catalyst samples were analyzed for coke by burning the carbon in a stream of $O_2$ and then measuring the quantity of CO and $CO_2$ formed. The results are shown in Table D infra.

TABLE D.—CRACKING OF PETROLEUM DISTILLATES WITH MONOVALENT CATION ZEOLITE CATALYSTS

| | Catalyst | | | |
|---|---|---|---|---|
| | CsX | CsX | KX | KX |
| Feed | Normal[1] paraffins | UCAR[2] | Normal[1] paraffins | UCAR[2] |
| Dehydroxylation in dry air, temp., °C | 600 | 600 | 600 | 600 |
| Hydroxyl content | N.o. | N.o. | N.o. | N.o. |
| Reaction temp., °C | 550 | 550 | 550 | 550 |
| Contact time, sec | 5.4 | 8.5 | 5.4 | 5.7 |
| Conversion, percent | 74.17 | 52.37 | 73.90 | 64.22 |
| Products:[3] | | | | |
| $H_2$ mole/100 mole conv | 27.97 | 71.68 | 15.37 | 57.75 |
| $CH_4$ | 3.68 | 4.56 | 3.10 | 3.81 |
| $C_2$ | 17.19 | 74.4 | 14.97 | 6.90 |
| $C_3H_6$ | 10.83 | 5.77 | 10.12 | 5.67 |
| $C_3H_8$ | 7.99 | 4.04 | 8.54 | 3.68 |
| n-Butane | 4.25 | 2.31 | 5.25 | 2.32 |
| n-Butene | 8.55 | 4.02 | 9.52 | 5.68 |
| Isobutane | | 1.05 | | 0.55 |
| Isobutene | 0.98 | 4.02 | 1.37 | 3.92 |
| n-Pentane | 3.15 | 1.60 | 3.25 | 1.93 |
| n-Pentenes | 8.41 | 3.74 | 5.70 | 4.55 |
| Isopentane | 0.06 | 0.96 | 0.06 | 1.52 |
| Cyclopentane | 2.45 | | 3.25 | 0.07 |
| n-Hexane | 1.68 | 1.92 | 2.21 | 2.73 |
| n-Hexenes | 3.71 | 2.05 | 3.24 | 2.48 |
| Dimethyl butanes | | 1.41 | | 4.30 |
| Methyl pentanes | 1.19 | 6.54 | 3.68 | 2.07 |
| Cyclohexane | | 2.69 | | 2.98 |
| Benzene | 1.19 | | 0.96 | |
| Methylcyclopentane | 0.70 | 0.51 | 0.59 | 0.66 |
| n-Heptenes | 3.27 | 1.50 | 3.18 | 1.35 |
| Methyl hexane | 0.65 | 0.45 | 0.43 | 0.77 |
| Dimethyl pentanes | 3.11 | 3.29 | 3.09 | 3.09 |
| Dimethylcyclopentanes | 4.58 | 4.94 | 5.15 | 6.57 |
| Ethylcyclopentane | | 2.99 | | 3.09 |
| Methylcyclohexane | 0.25 | 1.35 | 0.86 | 1.35 |
| Methylcyclohexene | 1.47 | 1.95 | 3.95 | 2.61 |
| Toluene | 1.47 | 7.34 | 1.55 | 7.51 |
| Dimethylcyclohexane | 0.65 | 0.17 | 0.88 | 0.99 |
| $C_8$ Normal | 1.87 | 2.57 | 1.18 | 3.77 |
| $C_8$ aromatic | 0.47 | 7.01 | 0.49 | 6.57 |
| Unknown | 1.96 | | | |
| Carbon formation on the catalyst, wt. percent | 4.29 | 11.78 | 4.16 | 6.50 |
| Straight chain | 24.36 | 11.67 | 23.72 | 14.48 |
| Branched chain | 1.04 | 6.03 | 1.42 | 5.99 |

[1] Normal paraffin is a $C_{11}$-$C_{14}$ product obtained from commercial petroleum distillates by the use of molecular sieves to extract the unbranched paraffins.
[2] UCAR is the residue of the petroleum distillate after the extraction of the normal paraffins. It contains $C_{11}$-$C_{14}$ hydrocarbons.
[3] The products are calculated in terms of carbon efficiency to show the mole percent of the feed consumed to obtain the various products.

NOTE.—N.o. = not observed.

What is claimed is:

1. Process for preparing olefins by the catalytic conversion of saturated hydrocarbons which comprises contacting said saturated hydrocarbons under catalytic cracking conditions with a catalyst comprising a three-dimensional zeolitic molecular sieve having a pore size large enough to adsorb benzene and having in its dehydrated state the general formula

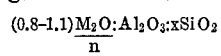

$$(0.8-1.1)\frac{M_2O}{n}:Al_2O_3:xSiO_2$$

wherein $x$ has a value of from 2 to about 20; M is a monovalent or a bivalent metal cation or mixture of said monovalent and bivalent metal cations; $n$ is the valence of M; said zeolite containing not more than 3 surface hydroxyl per 100 framework aluminum atoms, which surface hydroxyl exhibits infrared absorption in the region of 3500 to 3700 cm.$^{-1}$.

2. Process in accordance with claim 1 wherein $x$ has a value of from >3 to 20.

3. Process in accordance with claim 1 wherein the zeolite catalyst contains less than 1 surface hydroxyl per 100 framework aluminum atoms.

4. Process according to claim 3 wherein the metal cation M is monovalent and has an ionic radius of at least 1.10 angstrom units.

5. Process according to claim 2 wherein at least about 50 equivalent percent of the metal cation represented by M is one or a mixture of two or more of $K^+$, $Rb^+$, $Cs^+$, $Tl^+$, $Sr^{++}$, $Mg^{++}$ and $Ba^{++}$.

References Cited

UNITED STATES PATENTS 3,236,762 2/1966 Rabo et al. _____ 208—111
3,294,858 12/1966 Butler et al. _____ 260—683

DELBERT E. GANTZ, Primary Examiner
G. E. SCHMITKONS, Assistant Examiner

U.S. Cl. X.R.

252—455 Z; 260—683